United States Patent [19]

Ide

[11] Patent Number: 5,039,275

[45] Date of Patent: Aug. 13, 1991

[54] METHOD FOR TRANSFERRING CARGO BETWEEN VESSEL AND DOCK

[76] Inventor: Allan R. Ide, 4020 Elm St., Apt. A, Long Beach, Calif. 90807

[21] Appl. No.: 384,749

[22] Filed: Jul. 24, 1989

Related U.S. Application Data

[62] Division of Ser. No. 59,263, Jun. 5, 1987, Pat. No. 4,872,798.

[51] Int. Cl.$^5$ .................. B65G 63/00; B65G 67/60
[52] U.S. Cl. .................. 414/786; 414/141.3; 414/141.7
[58] Field of Search ............ 414/140.3, 141.3, 141.7, 414/142.6, 142.8, 140.8, 786

[56] References Cited

U.S. PATENT DOCUMENTS

| | | | |
|---|---|---|---|
| 1,525,950 | 2/1922 | Prescott | 414/140.8 |
| 2,451,198 | 10/1948 | Burke | 414/140.1 |
| 3,508,668 | 4/1970 | Young | 414/140.8 |
| 3,520,396 | 7/1970 | Lingg | 198/77 |
| 3,543,952 | 12/1970 | Young | 414/140.3 |
| 3,559,822 | 2/1971 | Lichtenford et al. | 414/140.3 |
| 3,591,013 | 7/1971 | Allen | 414/140.1 |
| 3,630,390 | 12/1971 | Tax et al. | |
| 3,807,582 | 4/1974 | Anderson | |
| 3,812,987 | 5/1974 | Watatani | |
| 4,018,349 | 4/1977 | Hupkes | |
| 4,160,617 | 7/1979 | Montgomery et al. | 414/141.3 |
| 4,172,685 | 10/1979 | Nabeshima et al. | 414/139.7 |
| 4,293,027 | 10/1981 | Tepe et al. | 165/16 |
| 4,431,359 | 2/1984 | Toniolo | 414/139.9 |
| 4,563,858 | 1/1986 | Van Der Wal et al. | 53/418 |
| 4,568,232 | 2/1986 | Juelich et al. | 414/139.3 |
| 4,599,027 | 7/1986 | Knapp | |

Primary Examiner—Robert J. Spar
Assistant Examiner—Janice Krizek

[57] ABSTRACT

A transfer frame mounted on a dock and formed with a pair of side by side elevator towers extending upwardly to about the level of the uppermost container on a ship to be unloaded and over on their sides facing such ship. Elevators are mounted in the towers for up and down movement to transfer cargo from the higher elevation to a lower elevation to be fed onto a feed conveyor. An overhead crane includes a boom projecting over the towers and over the containers on the ship. A trolley is mounted on the boom for shifting between the tower and ship and includes a hoist for hoisting cargo containers from the ship for transfer along under the beam and through such opening side of the tower to a position over one of the elevator platforms for being lowered a short distance thereto. Simultaneously, an outgoing container may be moved onto the other elevator and elevated for pick up by the hoist after the discharge container is released. The method of the present invention involves transfer of the containers via the trolley by elevating such containers slightly from their pick up points and transporting them along the boom to be loaded on the elevator platforms previously disposed at essentially at the same height and unloaded on the elevator platform at substantially the same elevation as the pick up point from the ship.

3 Claims, 5 Drawing Sheets

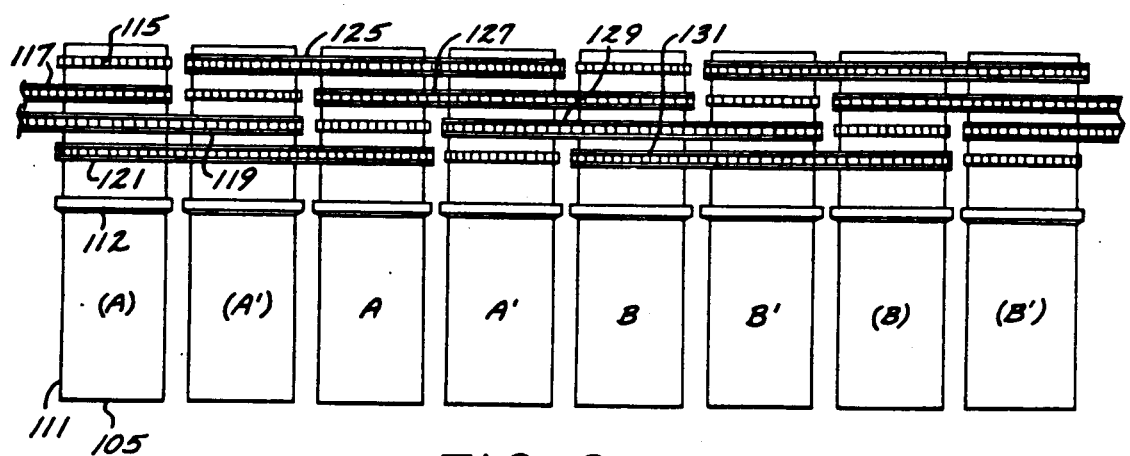
FIG. 8
FIG. 9
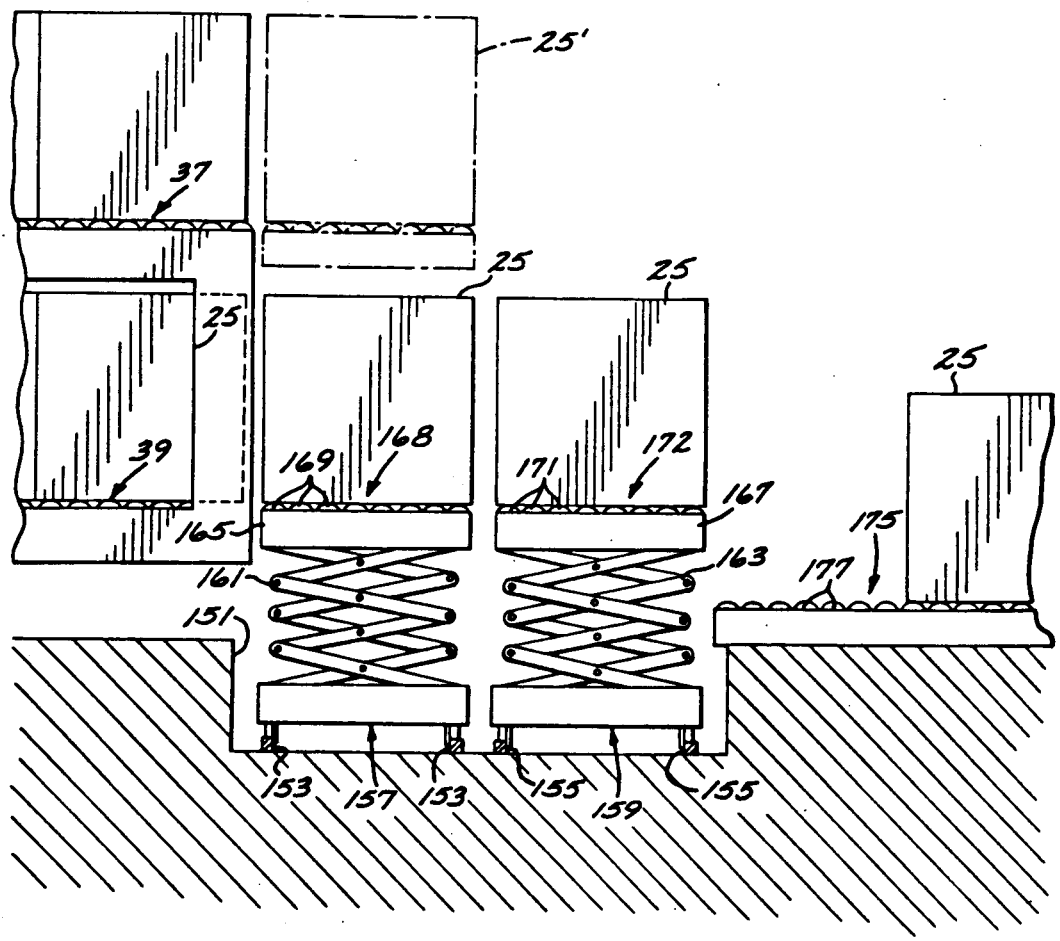

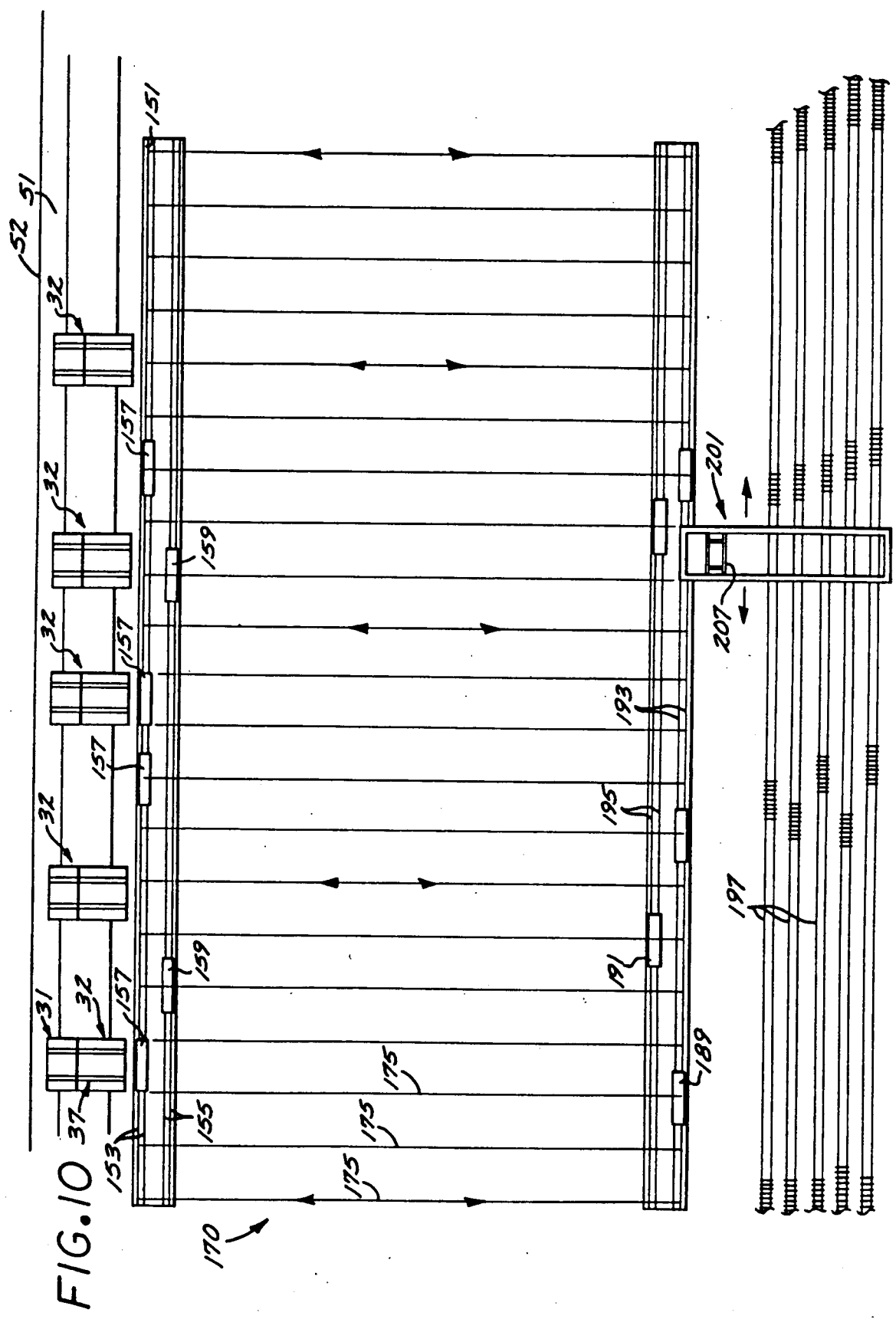

METHOD FOR TRANSFERRING CARGO BETWEEN VESSEL AND DOCK

This is a divisional of copending application Ser. No. 059,263 filed on 6/5/87, now U.S. Pat. No. 4,872,798.

BACKGROUND OF THE INVENTION

1. Field of the Invention

The present invention relates to an apparatus for rapidly loading and unloading cargo containers from a vessel, such as a ship and transporting them to a storage or ground transport area.

2. Description of the Prior Art

In the past decade and a half, much of the marine cargo industry has been converted to containerized cargo wherein products to be shipped are loaded in large containers of a size approaching that of a conventional truck cargo van and then loading the filled containers themselves on the ships. Such a containerized approach has proven popular and allows for loading and unloading thereof inland of the dock and subsequent transportation of such containers to and from the dock area for loading on a vessel. This allows for economical loading of the individual containers at a rate dictated by convenience and uninfluenced by the significant cost of lay time for a sea going vessel which must be at dock for the final loading process. Likewise, when such containers are unloaded from the vessel they may be transported by truck or train, fully loaded, to their destination where the unloading process of the containers themselves will take place.

Due to the fact that the hourly cost of a ship in harbor is considerable, many efforts have been made to provide for rapid loading and discharging of such cargo containers from the ship to thereby minimize the time a ship must remain in port for discharge and loading. One such cargo handling apparatus in common use utilizes a hoist mounted on a trolley carried on an overhead boom of a hammer head crane wherein the hoist may be attached to a container to hoist such cargo up to the trolley to be transported across the boom to be disposed over the hatchway to the ship's hold. The hoist is then actuated to lower the container into the hold. The process is then repeated until the ship's hold is filled. A hatch cover is then placed in position over the hatchway and additional containers then stacked on the hatch to a height of, for instance, four to five containers and seven to twelve athwartship, each container having a height on the order of eight feet.

Such system suffers the shortcoming that the trolley must be positioned over the container on the dock, the hoist lowered a distance of, for instance, 150 feet and attached to the container. The container must then be hoisted upwardly the same distance of 50–65 feet, and the trolley then transported out the boom and over the ship. Again, there, the container is lowered into the ship's hold or onto deck of the ship and the process repeated. Unloading of the ship is just the reverse. That is, the containers are picked up, first off the stack loaded on the ship's deck, the hatch cover removed and then the containers removed from the hold. It will be appreciated that the time consumed each time the hoist is raised and lowered is significant and that the trolley is fully occupied by a single container during the entire transfer procedure. In addition to the time consumption, such systems typically require a substantial amount of support equipment and personnel. That is, a crane driver is required for the trolley on the hammerhead crane, ship deckmen are required for attaching and detaching the cargo hoist, tractor or truck drivers are required for sequentially moving trucks, bogies or straddle trucks onto the dock area for receiving the cargo containers and removing them from the hoist area during the discharge operation. The need for more economical and efficient systems have led to many different proposals.

One such system involves a pair vertical conveyors, one dock side and another ship side, with a horizontal conveyor therebetween for automatically transferring pelletized loads up from the ship's hold, across the horizontal conveyor and down to the dock. An arrangement of this type is shown in U.S. Pat. No. 1,525,950 to Prescott. Such devices, while acceptable for their intended use, suffer the shortcoming that they cannot practically handle large containers typically used in maritime shipping and that their operation is hindered by surge and rise and fall of the tide which results in misalignment of the conveyors and renders transfer from one conveyor to the other impossible.

Other devices proposed include a horizontal hammerhead crane carrying a trolley mounting a hoist which is intended to pick up cargo from the ship to be lowered into a vertical elevator for subsequent transfer. A device of this type is shown in U.S. Pat. No. 4,431,359 to Toniolo. Again, while satisfactory for its intended purpose, such devices suffer the shortcoming that the elevators are not configured and arranged to receive the cargo containers sideways thereonto from the hoist without substantial lowering thereof each time transfer is made thus consuming undue time. Accordingly, substantial time is lost on each trip because of the necessity that the hoist raise the container to the full height so the trolley may carry it to a position disposed over the elevators so the cargo may be lowered some distance thereonto.

Accordingly, there exists a need a cargo handling system which provides for efficient movement of the trolley on the hammerhead crane with a minimum of down time for retrieving cargo containers from the ship's deck at approximately the elevation of the cargo's initial storage and transfer substantially horizontally directly to elevators located at about the same height so that vertical travel of the hoist is minimized to make most efficient use of the trolley.

SUMMARY OF THE INVENTION

The invention is intended to be used with a hammerhead crane having a horizontal boom extending from a point over cargo containers stacked on a ship's deck to a dock side tower open on the side facing the ship and mounting an elevator having a support platform which may be raised to the various levels corresponding with the horizontal levels of the containers on the ship to be unloaded. The trolley and hoist may thus be operated to transfer the containers to the elevator platform with only a minimum of vertical travel of the containers. A conveyor is provided at the foot of the elevator for transferring the cargo from the lowered elevator platform for storage or loading onto ground transportation, such as trucks or railroad cars. On the return trip the hoist may pick up a container from a loading elevator and transport it to the ship for loading thus utilizing travel in each direction of the trolley.

Other objects and features of the invention will become apparent from consideration of the following description taken in connection with the accompanying drawing.

BRIEF DESCRIPTION OF THE DRAWINGS

FIG. 8 is a broken top plan, in enlarged scale, showing the conveyor rollers depicted in FIG. 2.;

FIG. 9 is an elevational sectional view, in enlarged scale, of a queuing rail system which is utilized with the system shown in FIG. 1; and FIG. 10 is a diagrammatic view of a staging system employed with the transfer apparatus shown in FIG. 1.

Figure 1:
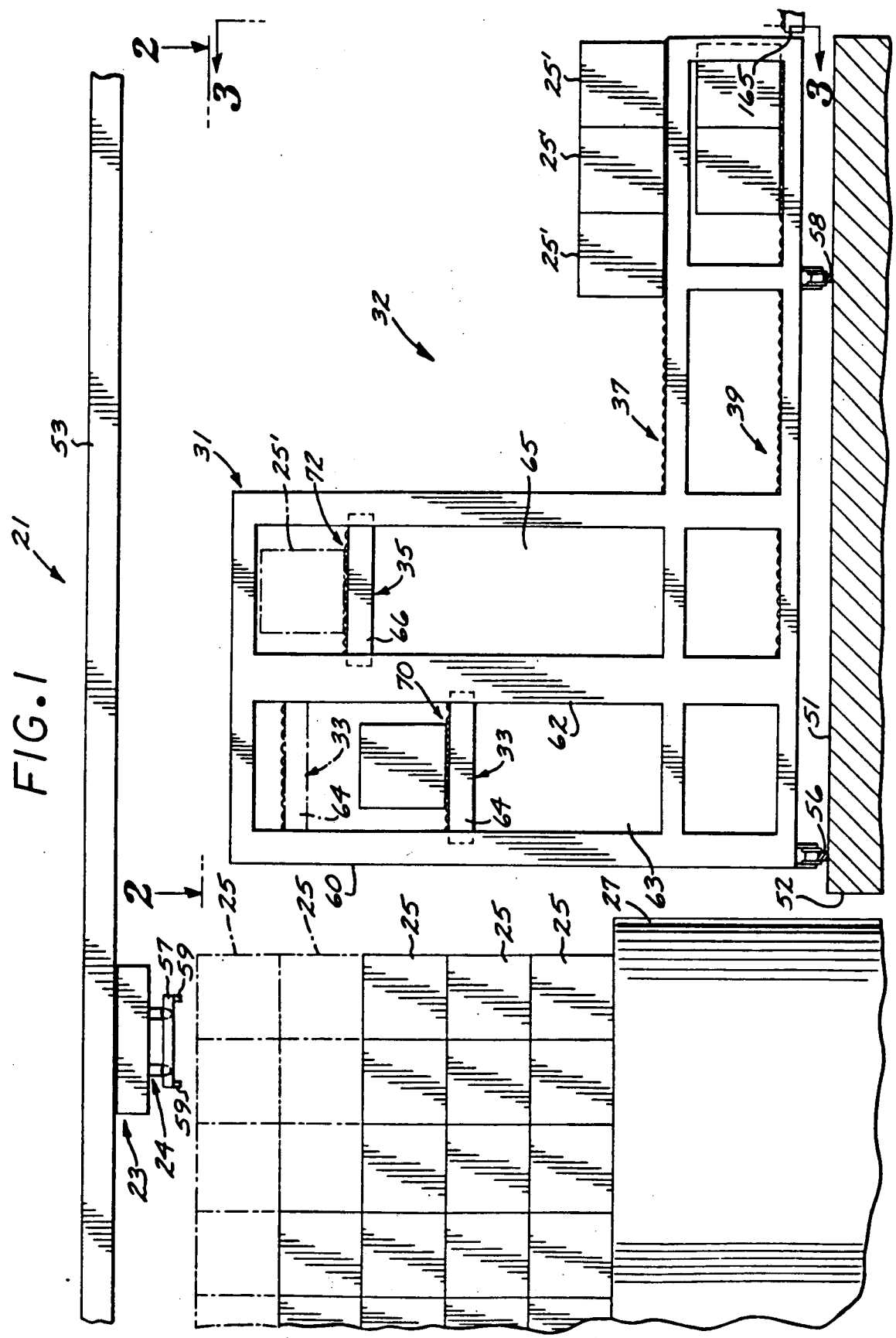
FIG. 1 is a broken elevational view of a cargo transfer apparatus embodying the present invention.

DESCRIPTION OF THE PREFERRED EMBODIMENT a. Overview

The cargo transfer system of the present invention includes, generally, a hammerhead crane 21 carrying a trolley 23 mounting a pair of hoists 24 for travel from a position over the top layer of cargo containers 25 stacked on the deck of a ship 27 to a location over a vertical tower 31 incorporated in a mobile transfer 32 mounted for travel along the pierhead 52 of the dock 51. The vertical tower 31 mounts a pair of loading and discharge elevators, generally designated 33 and 35, respectively, which are shown for the purposes of this disclosure as elevatable from a position at least level with the bottom of the top layer of containers to a position with respective load and discharge accumulator conveyors, generally designated 39 and 37, which feeds the containers away from or onto the support elevators 33 and 35, depending on whether the containers are being loaded or unloaded. Consequently, the hoist 24 may be activated to pick up a container 25 from the stack on the ship, the trolley 23 activated to carry it over the tower 31 as the loading elevator 33 reaches to its uppermost position shown in broken line in FIG. 1 such that it is at a level to receive the container 25 without substantial lowering thereof. After unloading, the troller 23 may continue on over the elevator 35 which has been raised to its elevated position to pick up a container 25' from that elevator, to be raised and transported back to the vessel for loading at a location for storage when the ship gets underway.

A vessel 27 coming loaded into port is typically moored along a dock or quay 51 (FIG. 1) and the unloading procedure undertaken to transfer the containers 25 from such vessel onto the dock. Once the ship has been fully or partially unloaded, a new load of containers 25' may be loaded on for transportation to another port. During this entire process, the vessel itself is subject to elevational shifting and movement induced by tide and surge.

b. The Crane 21 and Transfer 32

The hammerhead crane 21 may be of conventional construction and may be supported in cantilever fashion from a tower (not shown) on the dock 51. The crane includes a horizontal boom 53 mounting a track onto which the wheels of the troller 23 rides. The trolley itself includes a pair of coordinated hoists 24 carrying a spreader 57 therebetween. Depending from the opposite corners of the spreader are grabbers 59 for grabbing the top corners of the containers 25 for holding such container while they are hoisted to their elevated positions as described hereinafter.

The dockside transfer 32 is carried on wheels which ride on tracks 56 and 58 (FIGS. 1 and 10) and is formed with the vertical tower 31 (FIG. 1) which is of sufficient height to extend to the horizontal level of the bottom of the container 25 stacked on the uppermost layer. The tower 31 is formed with a pair of elevator shafts 63 and 65 (FIG. 2) having sufficient height to accommodate the overall length of the containers 25. Such shafts are open throughout their height on their sides facing the ship to form respective vertical openings defining doorways 60 and 62 (FIG. 2) for receipt therethrough of the containers 25 and 25' suspended from the hoists 24. The elevator shafts 63 and 65 receive respective rectangular floor frames 64 and 66 which act as respective container supports. Such elevator floors are formed at their opposite ends with pairs of parallel cross bars 67 and 69 which projecting laterally away from the vessel 27 and between which are mounted powered rollers 71 disposed in rows to define roller beds, generally designated 70 and 72 adapted to carry the containers 25 and 25' and drive them onto and off the elevators.

Figure 4:
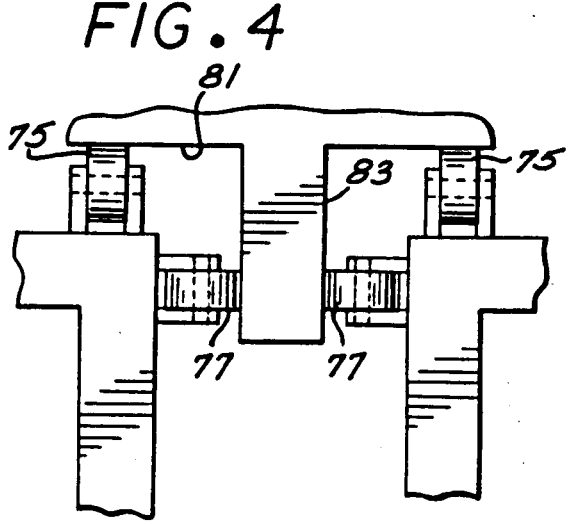
FIG. 4 is a detail view, in enlarged scale, taken from the circle designated 4 in FIG. 2.
Figure 6:
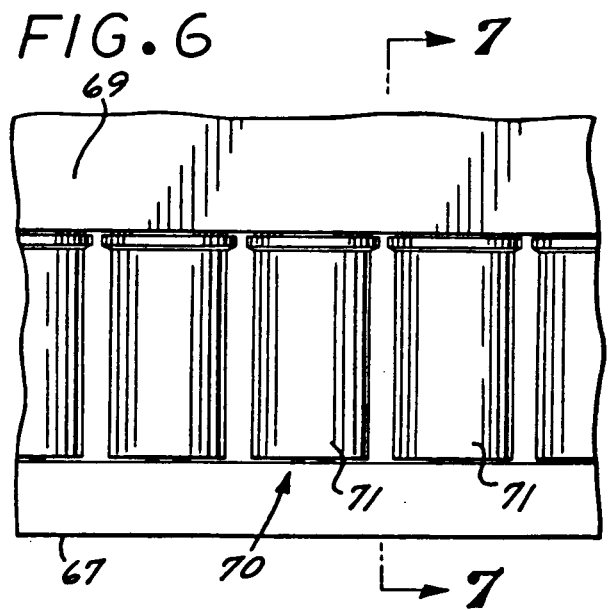
FIG. 6 is a detail view, in enlarged scale, taken from the circle 6—6 in FIG. 2.

The container support platforms 64 and 66 mount at their respective corners, in perpendicular relationship, rollers 75 and 77 (FIG. 4) which ride on the corner of vertical posts 81 and guide flanges 83 formed at the corners of the elevator shafts 63 and 65 to thus guide such supports as they travel upwardly and downwardly in the elevator shafts.

Figure 5:
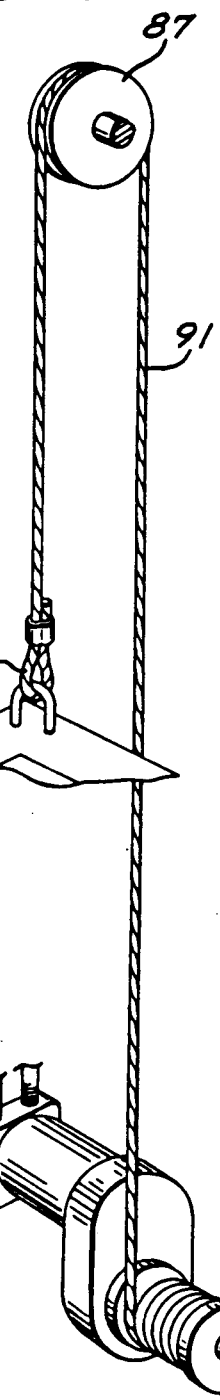
FIG. 5 is a broken view, in enlarged scale, of an elevator cable incorporated in the elevator shown in FIG. 3.

By the way of illustration herein, an elevator drive in the form of pullies 87 (FIG. 5) mounted at the top of the tower 63 have ropes 91 threaded thereover with one end 95 being connected to an elevator floor support 66 and the opposite end being wound on a power driven spool 99. It will be appreciated that separate drives are provided for each of the elevators 33 and 35 such that they may be shifted vertically independently of one another.

Figure 2:
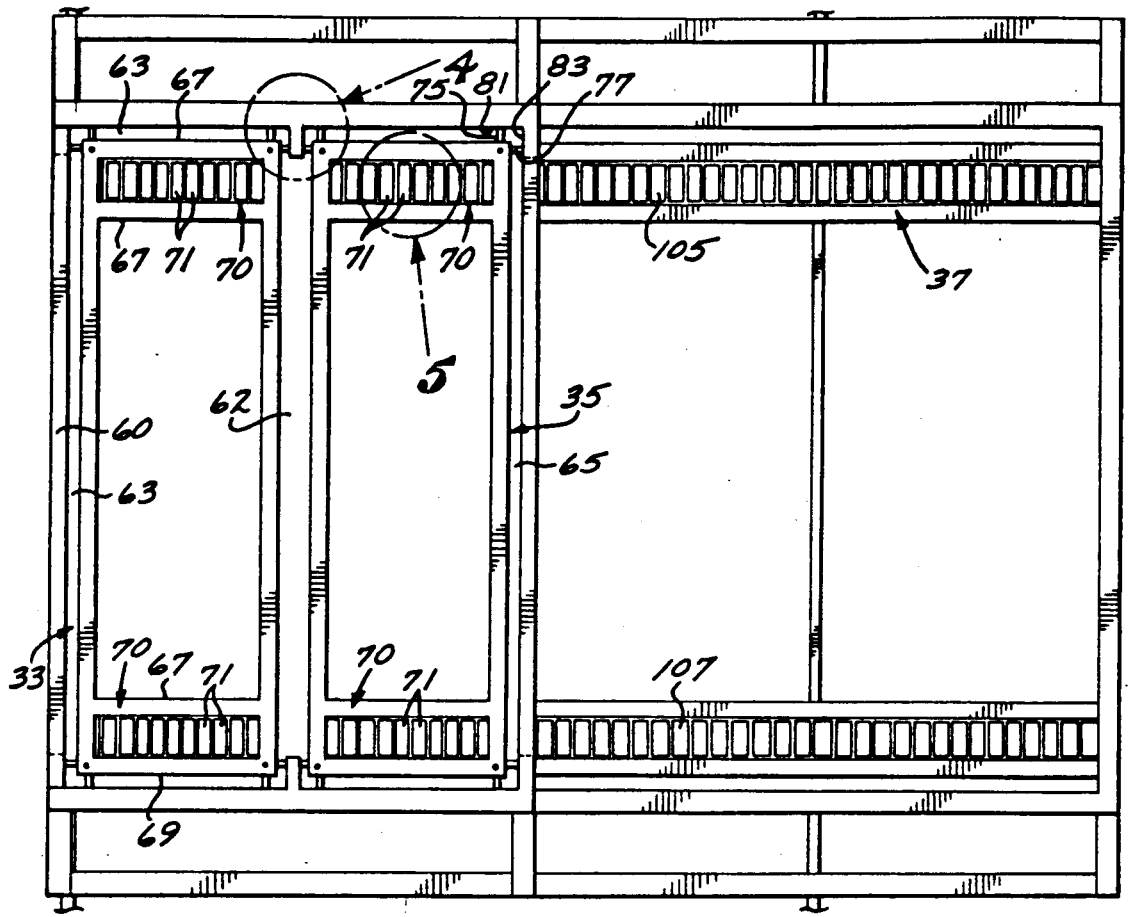
FIG. 2 is a top plan view taken along the line 2—2 of FIG. 1.
Figure 3:
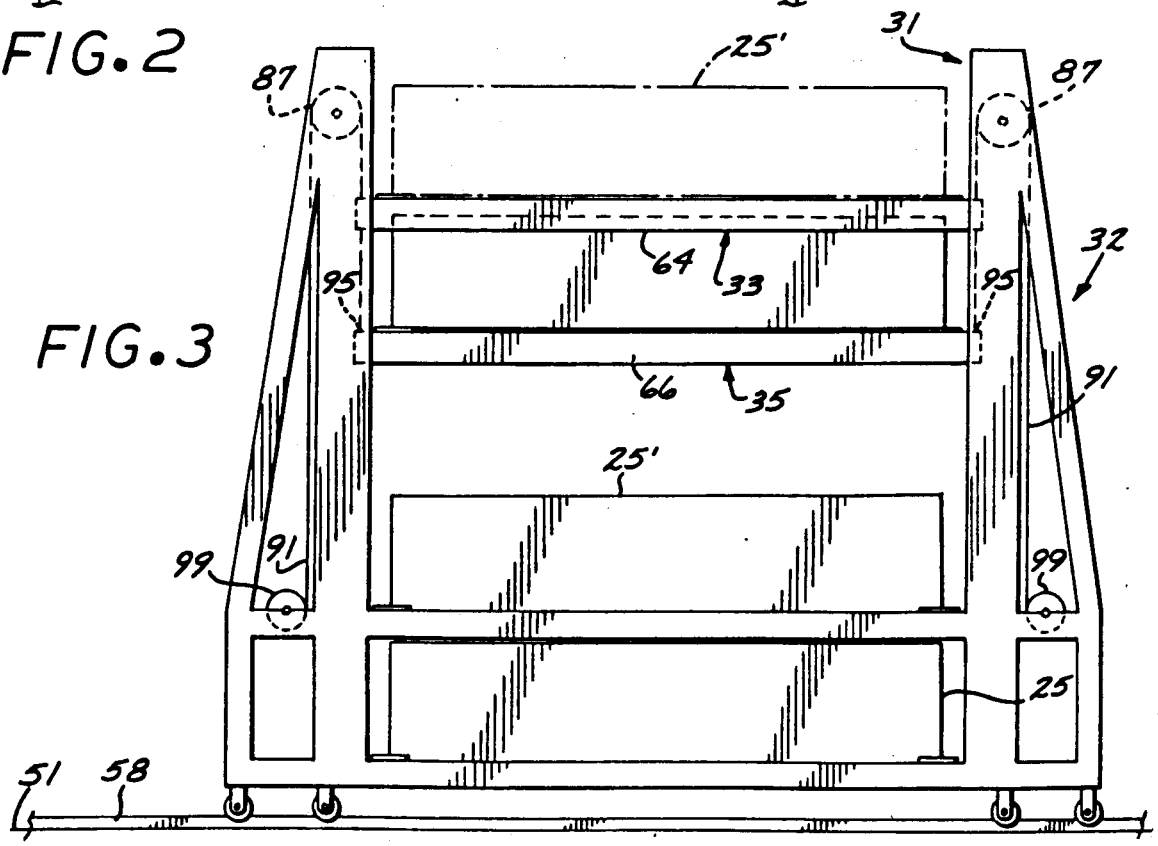
FIG. 3 is a side view taken along the line 3—3 of FIG. 1.
Figure 7:
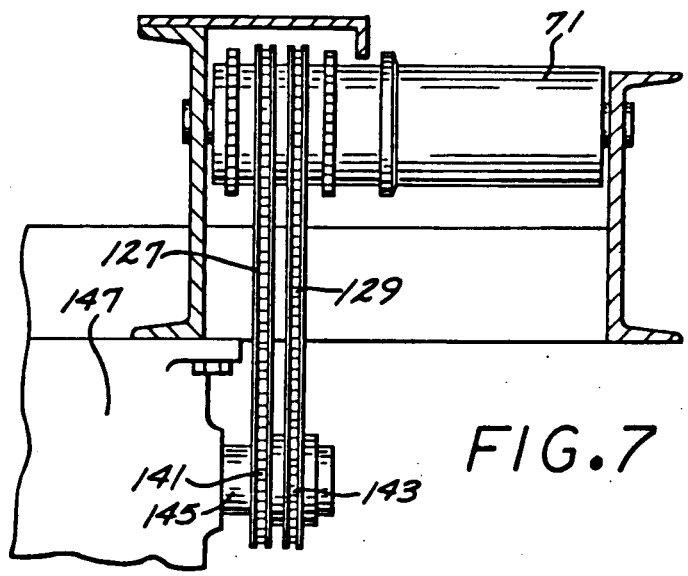
FIG. 7 is a transverse section view taken along the line 7—7 of FIG. 6.

Referring to FIGS. 1-3, the transfer 32 includes a frame formed with a horizontally disposed feed section projecting inland from the bottom of the tower 31 and formed with pairs of laterally disposed parallel rows of powered rollers 105 and 107 (FIG. 2) defining the feed tracks in the form of roller beds 37 and 39 leading away from the elevator tower 31. Referring to FIG. 8, the rollers 105 and 107 are formed with bearing sections 111, guide flanges 112 and four axially spaced apart driven chain sprockets 115, 117, 119 and 121. Sprockets of three adjacent rollers 105 are connected together by means of endless sprocket chains 125, 127, 129 and 131. The respective chains 125-131 are arranged in staggered relationship such that each chain is drivingly connected with at least the top sides of the driven chain sprockets of three rollers (FIG. 8) with the bottom run of pairs of laterally adjacent chains being threaded over drive sprockets such as the sprockets 141 and 143 shown in FIG. 7 and mounted on a common shaft 145 to thus afford parallel drive to each such roller.

In this regard, the drive chains of adjacent pair of rollers 105 are trained over drive sprockets 141 and 143 of respective drive shafts 145 coupled through a gear box to a drive motor 147. With this arrangement, each conveyor roller 105 is driven by two different drive chains such that should one chain 127 break, the other chain 129 will continue to drive those rollers.

c. Queuing Trucks 157 and 159 And Staging Yard 170

Referring to FIGS. 9 and 10, a plurality of transfers 32 may be positioned along the dock 51 adjacent the bulkhead 52 for conveying the containers 25 therefrom. As shown in FIG. 9, a trench 151 extends longitudinally of the dock at the end of the respective feed and transfer conveyors 37 and 39. Mounted in the trench 151 are two pairs of queuing rails 153 and 155 mounting thereon transfer trucks 157 and 159. Mounted from the trucks 157 and 159 by means of respective scissors jacks 161 and 163 are respective truck beds 165 and 167 which mount thereon powered conveyor roller beds 169 and 171. Located on the side of the trench 151, opposite the transfers 32 is a staging yard 170 formed by a plurality of laterally extending parallel staging conveyors 175 (FIGS. 9 and 10) which mount powered conveyor rollers 177 operative to drive the containers longitudinally therealong. With continued reference to FIG. 10, queuing trucks 189 and 191 similar the trucks 157 and 159 are located in a trench at the opposite ends of such separator tracks and travel on respective rails 193 and 195 extending transversely of such staging conveyors. Such trucks 181 and 189 travel along the ends of the staging conveyors 175 for selective receipt or deposit of containers 25 from or on to such conveyors to selectively transport such containers to a location under a train loading crane 21 to be described hereinafter.

Paralleling the queuing tracks 193 and 195 are railroad tracks 197 over which is disposed an overhead crane, generally designated 201, which travels back and forth along such tracks and carries a trolley 207 to selectively receive containers 25 from the trucks 189 and 191 to transfer them to rail cars on the railroad tracks 197. Conversely, it may receive containers 25' from such railroad cars to be transferred into the staging yard 170 for loading onto the ship as will be described hereinafter.

d. Unloading Incoming Containers 25

In operation, a container ship 27 arriving in port, will typically be loaded, the hold being loaded with containers 25 and additional containers stacked on the deck as shown in FIG. 1. The features of the present invention may be appreciated by considering an unloading ship discharge operation. It will be appreciated that once the ship 27 is brought into mooring position along the pier head 52 of the dock 51 (FIG. 1), one or more of the transfers 32 may be moved into position spaced longitudinally along the side of the ship under appropriately spaced hammerhead cranes 21. It will be appreciated by those skilled in the art that the controls for the transfers 31, rollers of the various roller beds on the elevators 33 and 35, loading and discharge roller beds 37 and 39, elevator motor, queuing trucks 157 and 159, roller beds 175 of the staging yard 170, queuing trucks 189 and 191 and transfer crane 201 may all be controlled by a computer system which may be programmed in advance of the ship's arrival with relevant information relating to the incoming cargo, destination thereof and train cars located on the train tracks 197, as well as information on containers 25' to be loaded.

Once the ship 27 has been moored and the hammerhead cranes 21 and transfers 32 shifted into position, the trolleys 23 may be actuated to drive such trolleys outwardly over the containers 25 stacked on the deck of the ship 27 to commence the unloading operation. By way of example, the process may start with the container 25 (shown in phantom) located in the upper right-hand corner, as viewed in FIG. 1. For that transfer, the hoists 24 may be activated to lower the spreader 57 a relatively short distance to enable the grabbers 59 to grab the corners of the container 25 being unloaded. The hoists 24 may then be actuated to raise the container two or three inches and the trolley actuated to travel to the right along the boom 53 a distance of, for instance 25 feet, to transport the container 25 through the open side 60 of the tower 31 to a location inwardly above the elevator platform 64. It will be appreciated that, in the meantime, the elevator has been actuated to raise the discharge elevator platform 64 to the broken line position shown in FIG. 1. By then actuating the hoists 24 to lower the spreader bar 57 two or three inches to allow the container to come to rest on the platform 64, the grabbers may be actuated to release the container 25 to free it to rest on the elevator roller bed 70 of the platform 64. The trolley 23 may then be actuated to move back along the boom over the ship to grasp the next container. Concurrently the elevator 33 is actuated to lower the platform 64 to its lowered position in horizontal alignment with the discharge conveyor 39 and the roller bed 70 then actuated to drive the container to the right on to the discharge roller bed 39. It will be appreciated that the roller bed 39 is then actuated to advance the discharge container 25 to the right along the roller bed, it being appreciated that such roller bed may incorporate a series of sensors and controls such that the containers may be stored thereon awaiting discharge to a queuing truck 157 (FIGS. 1 and 9). Such sensors and controls are well known to those skilled in the art so are not described here.

Returning now to the trolley 23, it will be appreciated that such trolley has meanwhile been shifted to the left along the boom 53 to pick up another container 25 and return to a position over the elevator 33 to meet the upcoming unloaded platform 64. This process is repeated until an area of the deck or the hold has been sufficiently unloaded to receive incoming cargo.

e. Loading Outgoing Containers 25'

When loading of the outgoing containers 25' is to be commenced, the outgoing elevator 35 is actuated to lower the platform 66 to the level of the outgoing transfer roller bed 37 such that the bed 37 may be actuated to drive an outgoing container 25' onto the roller bed 72 of the elevator platform 66. The elevator 35 is then actuated to raise the platform 66 to approximately the position shown in FIG. 1. When the container 25 being discharged has been unloaded from the trolley 23, the trolley may then be actuated to move six to ten feet to the right to position the spreader 57 over the outgoing container 25' and the hoist 24 actuated to lower the spreader to enable the grabbers 59 to grab the corners of the outgoing container 25'. The hoists 24 are again actuated to raise the container 25' and the trolley actuated to commence moving leftward along the boom 53. It will be appreciated that after initial hoisting of the container 25', hoisting thereof may be continued as the trolley 23 travels to the left over the discharge elevator platform 64 descending down in the elevator shaft 63. It will be appreciated that, in the case of a computer control system, the travel orientation and stopping of the elevators 33 and 35 may be programmed to most economically and efficiently allow for minimum travel of the hoist 24 in making a transfer between one and the other, all dependent on the elevation at which containers are being loaded and discharged from the ship 27. In any event, the outgoing container 25' will be advanced over the ship, the hoists 24 actuated to lower the container onto the ship, the grabbers 59 released and the hoists and trolley 23 and 24 actuated to move into position over a container 25 to be discharged and the process repeated.

f. Queuing And Transferring

Referring to FIGS. 9 and 10, the discharged containers 25 are sequentially received on queuing trucks 157 and 159 travelling in the trench 151 past the end of the transfers 32 for travel along the trench 151 to a selected transfer roller bed 175 in the transfer yard 170 for temporary storage and/or direct advancement to railroad queuing trucks 189 and 191 disposed on the tracks 193 and 195 at the opposite end of such transfer beds 175. Thus, it will be appreciated that the respective trucks 157 may be aligned with the ends of the respective discharge transfer roller beds 39 to receive the containers 25, final positioning of the container on the truck bed 165 being achieved by the powered roller bed 168. The loaded queuing truck 157 may then be advanced along the trench 151 into alignment with the end of the selected staging conveyor 175. The adjacent truck 159 may be simultaneously moved into position beside the truck 157, the elevating jacks 161 and 163 being actuated to maintain the roller beds 168 and 172 in horizontal alignment with one another and in horizontal alignment with the particular conveyor 175 to which the container 25 is to be transferred. If both beds 168 and 172 are loaded, the container 25 on the bed 172 will be advanced to the conveyor 175, followed by the container 25 supported on the bed 168. In the event only the bed 168 is loaded, the back container will merely be transferred across the roller bed 172 to the conveyor bed 175. The containers may then be stored on the staging conveyors 175 until loading of a train or trains on the tracks 197 is to be commenced.

When the train cars have been moved into position, the containers 25 may be received off from the ends of the transfer conveyor beds 175 and onto the trucks 191 for transfer laterally to the cars 189 and to be picked up by the trolley 207 on the overhead crane 201 to be transferred along the boom of such crane for deposit on the respective rail cars.

It will be appreciated that a section of the staging yard 170 may be assigned to cargo to be loaded onto the ship 27. For that cargo, the containers 25 may be advanced along the roller beds of the staging conveyors 175 and onto the queuing trucks 159 shifted into alignment with the ends of such conveyors. The loaded queuing truck 159 may then be transferred along the rails 155 in the trench 151 into alignment with the end of the particular loading roller bed 37 (FIG. 9) of the transfer 32 to receive such conveyor. A parallel queuing truck 157 will be also moved into position between the transfer feed bed 37 and the truck 159 and the beds 168 and 172 of such trucks elevated by means of the jacks 161 to a level corresponding with the level of the feed conveyor 37. The roller beds 172 and 168 are then actuated to transfer the container 25' onto the feed roller bed 37 to be eventually transferred onto the elevator 35 as described hereinabove.

It will be appreciated that each of the aforedescribed operations will be coordinated with one another and will be tied into a conventional computer program to enable the most efficient coordination of operations. The loading and unloading procedure may be preprogrammed prior to the ship arriving in harbor such that coordination of the trolley 23, hoists 24, elevators 33 and 35, roller beds 37 and 39, queuing trucks 157, 159, 189 and 191 and staging conveyors 175 and possibly even the overhead transfer crane 201 are all coordinated in movement to thus assure the greatest degree of efficiency and minimum lay time for the vessel 27. In this regard, it has been demonstrated that with conventional methods, as described in the prior art section of this specification, only approximately 20 to 25 containers are loaded or unloaded per hour. The attendant equipment and personnel necessary to handle that volume of transfer is considerable. Conventional systems do not typically have capability of unloading directly from the ship to rail or truck as provided for with the present invention. Rather, each container is unloaded, stored and then rehandled for staging at dock side.

With the present system a container can be loaded or unloaded in between 12 and 20 seconds, and in no case more than 30 seconds, with an overall capacity on the average of about 120 containers per hour. Additionally, the support equipment and personnel may be cut approximately in half. This more than doubles the efficiency of loading and unloading, represents an increase in productivity, reduction in the energy consumed, reduces air pollution, adds to safety conditions at the docks and, by transferring directly to the train, reduces highway traffic. These benefits are provided with a relatively economical and reliable system which is relatively inexpensive to manufacture and install.

Various modifications and changes may be made with regard to the foregoing detailed description without departing from the spirit of the invention.

I claim:

1. A method for transferring containers between a dock and a vessel positioned adjacent said dock, comprising the steps of:

selecting an overhead boom of a type which horizontally projects from a position over said dock to a position over said vessel and which includes a trolley, shiftable between said dock and said vessel, said trolley further including a hoist capable of releasably grasping and raising and lowering individual ones of said containers while conveying it along a pathway from said vessel to said dock;

selecting a dockside transfer apparatus positioned on said dock below said boom and of the type including a first container support raisable from a lowered position proximate said dock to a raised position and laterally accessible by said containers throughout the elevations from said lowered to said raised positions as said individual containers are conveyed along said pathway;

retrieving a first container by shifting said trolley along said boom to a position above said first container on or in said vessel, lowering said hoist to grasp said first container and raising said first container to a level sufficient to clear said vessel;

concurrent with said retrieving step, raising said first container support to a transfer elevation substantially level with the retrieved first container;

shifting said trolley to carry said first container along said pathway to position it directly on said first container support;

releasing said first container from said hoist;

lowering said first container support to said dock and offloading said first container from said first container support to said dock; and shifting said trolley along said boom to a position over said vessel.

2. A method for transferring containers according to claim 1 wherein:

said step of selecting said transfer apparatus includes the step of selecting a transfer apparatus of the type including a second container support raisable from a lowered position to a raised position and laterally accessible by said containers throughout the elevations therebetween;

simultaneously with said step of raising said first container support, raising said second container support, supporting a second container, to substantially said transfer elevation; and after releasing said first container from said hoist and during said lowering step, shifting said trolley to a position over said second container;

grasping said second container; and shifting said trolley to position said second container over said vessel.

3. A method for transferring containers according to claim 1 that includes:

the step of repeating the steps set forth in claim 1 for transferring a plurality of containers from said vessel to said dock;

receiving and accumulating such off loaded containers on an accumulator conveyor on said dock until a number of said containers have been accumulated; and conveying said containers away.

* * * * *